United States Patent [19]
Mason et al.

[11] Patent Number: 5,681,905
[45] Date of Patent: Oct. 28, 1997

[54] GAMMA RADIATION-RESISTANT BLEND OF POLYCARBONATE WITH POLYESTER

[75] Inventors: James P. Mason, McKees Rocks; Sivaram Krishnan, Pittsburgh; Walter G. Chwala, Burgettstown, all of Pa.

[73] Assignee: Bayer Corporation, Pittsburgh, Pa.

[21] Appl. No.: 698,595

[22] Filed: Aug. 16, 1996

Related U.S. Application Data

[63] Continuation of Ser. No. 343,799, Nov. 22, 1994, abandoned.
[51] Int. Cl.⁶ .................. C08L 69/00; C08L 67/02; C08L 83/06
[52] U.S. Cl. .................. 525/438; 525/439; 525/463; 523/136; 524/109; 524/114; 524/265; 524/266
[58] Field of Search .................. 525/438, 439, 525/463; 523/136; 524/109, 114, 265, 266

[56] References Cited

U.S. PATENT DOCUMENTS

| | | | |
|---|---|---|---|
| 4,393,158 | 7/1983 | Miller | 524/114 |
| 4,786,692 | 11/1988 | Allen et al. | 525/439 |
| 5,405,892 | 4/1995 | Krishnan | 524/114 |
| 5,508,344 | 4/1996 | Mason | 525/438 |

FOREIGN PATENT DOCUMENTS

| | | | |
|---|---|---|---|
| 505869 | 9/1992 | European Pat. Off. | |
| 148560 | 7/1987 | Japan | 525/463 |

*Primary Examiner*—David Buttner
*Attorney, Agent, or Firm*—Joseph C. Gil; Aron Preis

[57] ABSTRACT

An improved thermoplastic molding composition containing polycarbonate and a polyester copolymer based on cyclohexane-dimethanol, ethylene glycol and phthalic acid is disclosed. Improved resistance to gamma-radiation results from the incorporation of a siloxane compound which contains an oxirane group.

5 Claims, No Drawings

GAMMA RADIATION-RESISTANT BLEND OF POLYCARBONATE WITH POLYESTER

This application is a continuation of application Ser. No. 08/343,799 filed Nov. 22, 1994, now abandoned.

FIELD OF THE INVENTION

The invention is directed to a thermoplastic molding composition and more particularly to a composition containing polycarbonate and a polyester copolymer of cyclohexane dimethanol.

SUMMARY OF THE INVENTION

An improved thermoplastic molding composition containing polycarbonate and a polyester copolymer based on cyclohexanedimethanol, ethylene glycol and phthalic acid is disclosed. The improvement in terms of resistance to gamma-radiation results from the incorporation of a siloxane compound which contains an oxirane group.

BACKGROUND OF THE INVENTION

Thermoplastic molding compositions containing a mixture of polycarbonate and a polyester copolymer derived from cyclohexane dimethanol and phthalic acid have been disclosed in U.S. Pat. No. 4,786,692. Characterized by their low heat distortion temperatures, high tensile and flexural strength, the compositions are said to be compatible with impact modifiers and flame retardants. The possible addition of stabilizers is noted in the '692 patent at column 11, line 64. A melt stable, pigmented polycarbonate composition containing the silixane of the present invention has been disclosed in patent application Ser. No. 08/263,702 filed Jun. 22, 1994, assigned to Miles Inc. of Pittsburgh, Pa.

DETAILED DESCRIPTION OF THE INVENTION

The composition of the invention contains (i) about 1 to 99, preferably 10 to 98, most preferably 60 to 90 percent by weight of a polycarbonate resin, (ii) about 1 to 99, preferably 2 to 90, most preferably 10 to 40 percent by weight of a polyester copolymer of phthalic acid and cyclohexanedimethanol (CHDM)/ethylene glycol (EG), and (iii) a positive, effective amount, preferably about 0.01 to 0.4, preferably 0.01 to 0.25 phr, relative to the total weight of (i) and (ii), of a siloxane which contains an oxirane group, said effective amount being sufficient to impart to the resinous blend a degree of resistance to degradation induced by exposure to gamma radiation.

Aromatic (co)polycarbonates within the scope of the present invention generally have a weight average molecular weight of 10,000–20,000, preferably 20,000–80,000 and their melt flow rate, per ASTM D-1238 at 300° C., is about 1 to about 65 gm/10 min., preferably about 2 to 15 gm/10 min. These may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incoporated herein by reference).

In the present context, dihydroxy compounds suitable for the preparation of the polycarbonates of the inventor conform to the structural formulae (1) or (2).

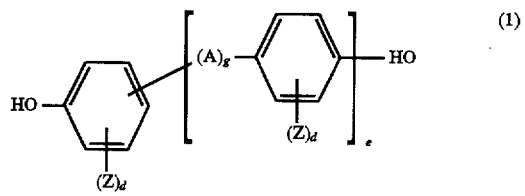

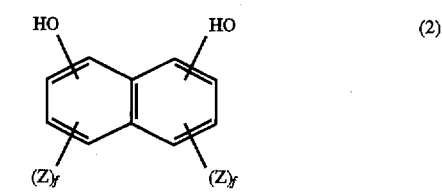

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or $SO_2$ or a radical conforming to

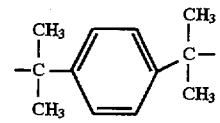

e and g both denote 0 or 1; Z is F, Cl, Br or a $C_{1-4}$ alkyl and if several Z radicals are substituents in one aryl radical they may be identical or different from one another, d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, α,α-bis-(hydroxyphenyl)-diisopropylbenzenes, and 2,2,4-trimethylcyclohexyl-1,1-diphenol as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol-A), 2,4-bis-(4-hydroxyphenyl)-2-methyl-butane, 1,1-bis-4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenol)-methane, 2,2-bis-(3,5-dimethyl-4-hydroxyphenyl)-propane, bis-(3,5-dimethyl-4-hydroxyphenol)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane; 2,2,4-trimethylcyclohexyl-1,1-diphenol; α,α'-bis-(3,5-dimethyl-4-hydroxy-phenyl)-p-diisopropylbenzene and 4,4'-sulfonyl diphenol.

Examples of particularly preferred aromatic bisphenols are 2,2, -bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol-A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenyl; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008, and 2,991, 273.

The preferred process for the preparation of polycarbonate is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of Miles Inc. of Pittsburgh, Pa.

Polycarbonate resin suitable in the practice of the invention are known and their structures and methods of preparation have been disclosed, for example in U.S. Pat. Nos. 3,030,331; 3,169,121; 3,395,199; 3,729,447; 4,255,556; 4,260,731; 4,369,303 and 4,714,746 all of which are incorporated by reference herein.

The polyester copolymer of the invention comprises the reaction product of a glycol portion which contains 1,4-cyclohexane-dimethanol (CHDM) and ethylene glycol (EG) wherein the molar ratio of CHDM to EG is from about 1:1 to 4:1, preferably the glycol portion has a predominance of CHDM over EG, with an acid portion comprising at least one of phthalic acid and isophthalic acid.

The polyester copolymer component may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethyl-terephthalate, together with the dihydric alcohols are charged to a flask and heated to temperatures sufficient to cause condensation of the copolymer to begin, for example to 175°–225° C. Thereafter, the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalyts for use herein are very well known in the art and are too numerous to mention individually herein. Generally, however, when an alkyl ester of the dicarboxylic acid compound is employed, an ester interchange type of catalyst is preferred, such as $NaHTi(OC_4H_9)_6$ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use in the subject invention generally will have an internal viscosity of at least about 0.4 dL/g as measured in 60/40 phenoltetrachloroethane or other similar solvent at about 25° C. The relative amounts of the 1,4-cyclohexanedimethanol to ethylene glycol in the glycol portion may vary so long as the molar ratio of 1,4-cyclohexanedimethanol to ethylene glycol is from 1 to 4:1, preferably there will be a molar predominance of CHDM over EG.

A preferred copolymer for use in the subject invention is a copolyester as described above wherein the glycol portion has a predominance of 1,4-cyclohexanedimethanol over ethylene glycol, e.g. greater than 50/50 mixture; especially preferred is the copolyester the glycol portion of which contains about 80 mol %, 1,4-cyclohexane-dimethanol and 20 mol % ethylene glycol and where the acid portion is terephthalic acid. When this preferred copolyester is blended with bisphenol-A polycarbonate, the resultant blends are generally completely miscible over a broad range of the components, exhibit a single glass transition temperature indicating the formation of a single phase blend and exhibit transparency of greater than 80%. These blends show significant reduction in heat distortion temperature over polycarbonate and in addition retain very high flexural and tensile strength. A commercially available copolyester of this preferred type is KODAR PCTG sold by the Eastman Kodak Company.

A polyester copolymer suitable in the preparation of the composition of the invention is represented by Eastman's Ektar DN001, which is characterized in that its intrinsic viscosity is about 0.72 to 0.8 and in that the ratio of CHDM to EG is about 4:1.

The stabilizer in accordance with the invention conforms to

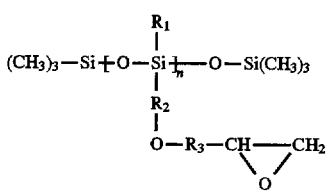

where
$R_1$ is $C_{1-4}$ alkyl or $C_{6-14}$ aryl,
$R_2$ denotes $(CH_2)_m$ where m is an integer of 1 to 4,
$R_3$ is $(CH_2)_p$ where p is 1 to 4 and
n is about 1 10,000, preferably 2 to 30, more preferably 3 to 25.

In the preferred embodiment, the composition of the invention is substantially transparent and the stabilizer is characterized in that the repeat unit n is about 2 to 30, preferably 3 to 25. In most advantageous embodiment $R_1$ is methyl, $R_2$ denotes $(CH_2)_3$ and $R_3$ is $CH_2$ and n is about 7 to 11.

A particular siloxane which was found useful in the preparation of the composition of the invention is represented by

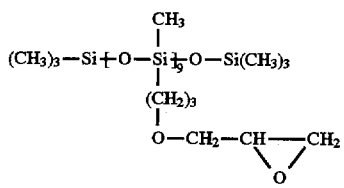

The composition of the invention may contain impact modifiers, flame-retarding agents, reinforcing agents, fillers and pigments and the like all of which are known in the art for their utility in polycarbonate/polyester blends.

The composition of the invention is prepared by methods and procedures which are well known in the art. The following working examples are illustrative of the invention.

EXAMPLES

Compositions in accordance with the invention were prepared and their properties determined. In preparing the compositions which are described below, the polycarbonate resin was Miles' Makrolon 3100 homopolycarbonate resin based on bisphenol-A having a melt flow index of about 4.5 g/10 min. per ASTM D-1238. The polyester copolymer (polyester copolymer 1) was Eastman's Ektar DN001, having an inherent viscosity of 0.72 to 0.8.

The siloxane according to the invention used in the examples conforms to

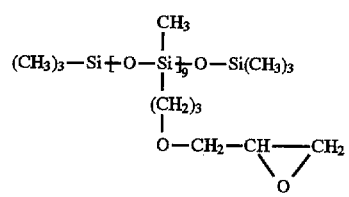

The compositions were first extruded in a twin screw extruder and plaques having a thickness of 0.100" were molded on a 3 oz. Newbury machine. Optical properties were determined by using a Diano Matchscan Spectrometer. The plaques were exposed to gamma radiation 3. Mrad and color change was then determined. The amounts of the resinous components of the compositions described in the table are given in percent by weight and the additives are given as phr (weight per hundred resin). The difference in Yl is calculated by subtracting the Yl before exposure to gamma radiation from the corresponding value after exposure.

| | 1 | 2 | 3 | 4 | 5 | 6 | 7 | 8 |
|---|---|---|---|---|---|---|---|---|
| polycarbonate | 90 | 90 | 70 | 70 | 70 | 70 | 60 | 60 |
| polyester copolymer | 10 | 10 | 30 | 30 | 30 | 30 | 40 | 40 |
| siloxane | 0.0 | 0.01 | 0.0 | 0.01 | 0.1 | 0.5 | 0.0 | 0.01 |
| YI[1] | 3.6 | 4.7 | 13.1 | 6.5 | 12.4 | opq[3] | 15.2 | 6.7 |
| YI[2] | 13.7 | 12.5 | 18.0 | 10.9 | 16.1 | | 18.8 | 9.7 |
| ΔYI | 10.1 | 7.8 | 4.8 | 4.4 | 3.7 | | 3.6 | 3.0 |

[1]Yellowness index
[2]optical properties after exposure to gamma radiation followed by 14 days conditioning in darkness
[3]opaque The data show that the resistance to degradation induced by gamma radiation is imparted to the composition of the invention by the incorporation of the siloxane of the invention at an amount as low as 0.01 phr.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A substantially transparent thermoplastic molding composition comprising (i) about 1 to 99 percent by weight of a polycarbonate resin, and (ii) about 1 to 99 percent by weight of a polyester copolymer of phthalic acid and a mixture of cyclohexanedimethanol and ethylene glycol and (iii) about 0.01 to 0.4 phr relative to the total weight of (i) and (ii) of a siloxane conforming structurally to

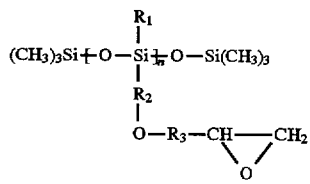

where $R_1$ is $C_{1-4}$ alkyl or $C_{6-14}$ aryl, $R_2$ denotes $(CH_2)_m$ where m is an integer of 1 to 4, $R_3$ is $(CH_2)_p$ where p is 1 to 4 and n is about 1 to 10,000 said composition having a degree of resistance to degradation induced by exposure to gamma radiation greater than that of a corresponding composition which contains no siloxane, said cyclohexane dimethanol and said ethylene glycol being present in said polyester copolymer in a molar ratio of 1:1 to 4:1 therebetween.

2. The composition of claim 1 wherein said n is 2 to 30.

3. The composition of claim 1 wherein amount is about 0.01 to 0.25 phr relative to the total weight of (i) and (ii).

4. The composition of claim 1 wherein said siloxane conforms to

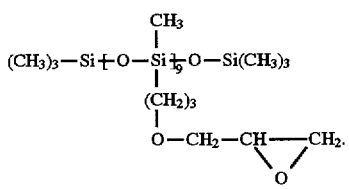

5. The composition of claim 4 wherein amount is about 0.01 to 0.25 phr relative to the total weight of (i) and (ii).

* * * * *